United States Patent

Fogarty

[11] 3,868,072
[45] Feb. 25, 1975

[54] ORBITAL ENGINE
[76] Inventor: Charles P. Fogarty, Box 254, Commack, N.Y. 11725
[22] Filed: Sept. 28, 1971
[21] Appl. No.: 184,414

Related U.S. Application Data
[63] Continuation-in-part of Ser. No. 664,463, Aug. 30, 1967, abandoned.

[52] U.S. Cl. .............................. 244/1 SS, 244/1 SB
[51] Int. Cl. ............................................. B64g 1/00
[58] Field of Search..... 244/1 SS, 1 SA, 1 SD, 1 SB, 244/62; 60/202

[56] References Cited
UNITED STATES PATENTS
3,152,260  10/1964  Cummings..................... 244/1 SS X
3,437,286  4/1969  Lindley............................ 244/1 SA OTHER PUBLICATIONS
"Tether-Line Retrieval of Astronauts Under Emergency Conditions," E. Parsons, Jr., and P. M. Kenner, Lead Dynamics Enginers, LTV Aerospace Corp., pp. 284–290.
"NASA Twelfth Semiannual Report to Congress, Advanced Research and Technology," pp. 107–108.
"Study of the Retrieval of an Astronaut from an Extra-Vehicular Assignment," Warren H. Straly and Robert W. Adloch, NASA CR-185, February, 1965, pp. 2, 5, 8, 9, 18, 19, 21, and 84.

*Primary Examiner*—Trygve M. Blix
*Assistant Examiner*—Barry L. Kelmachter
*Attorney, Agent, or Firm*—Browdy and Neimark

[57] ABSTRACT

An orbital engine operable in a space environment having a first mass tethered to a relatively larger second mass, said second mass being connected to an elongate member whereby the longitudinal axis of said elongate member is in alignment with the center of mass of the second mass, said elongate member extending from and rotatably supported by a space vehicle, said first mass being adapted to orbit about said second mass in response to forces which apply an outside torque to the system in orbit, said torque being converted into angular momentum which is transmitted through the tether to said second mass whereby the latter is caused to rotate and whereby said elongate member will rotate therewith.

30 Claims, 10 Drawing Figures

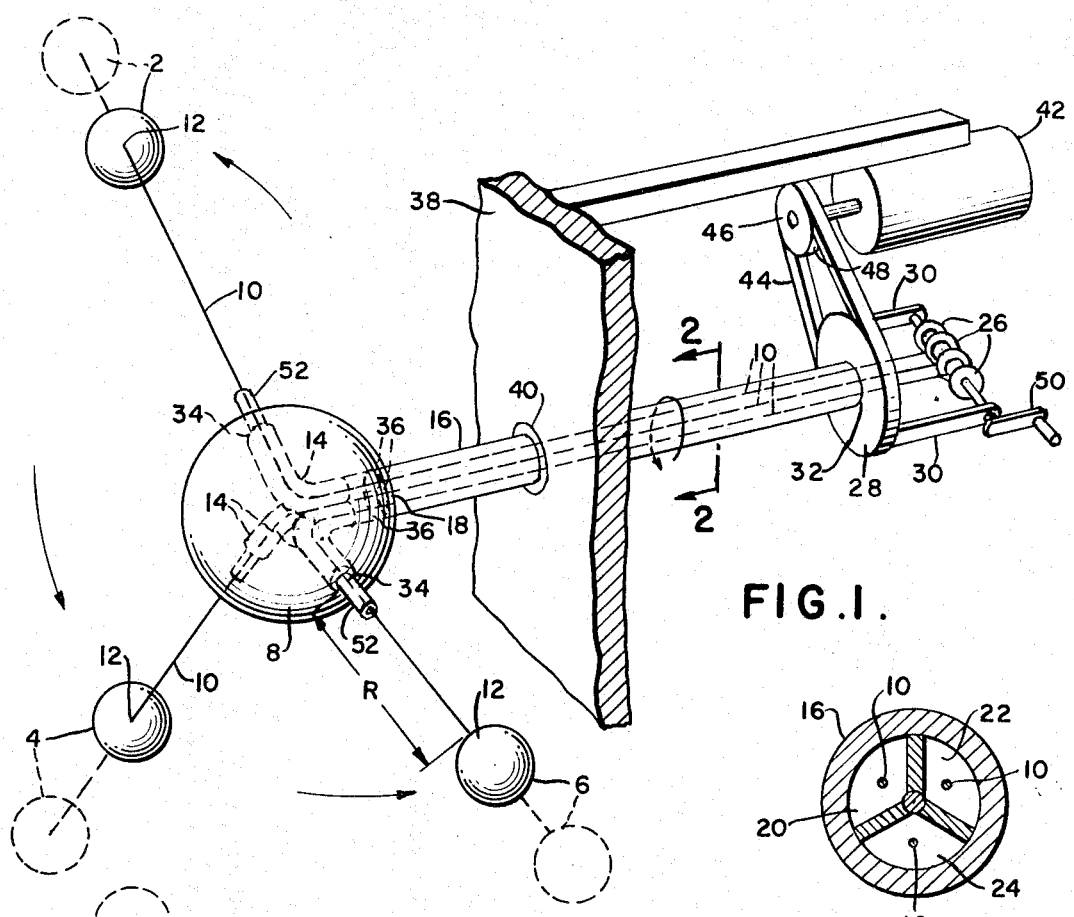
FIG.1.
FIG.2.
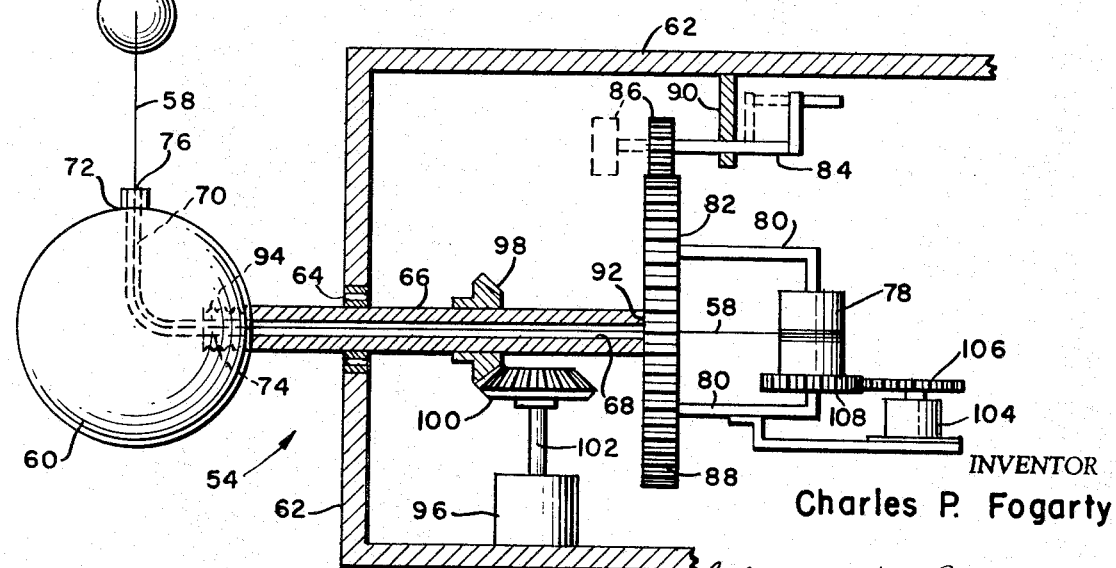
FIG.3.
INVENTOR
Charles P. Fogarty
BY Clive H. Bramson
ATTORNEY

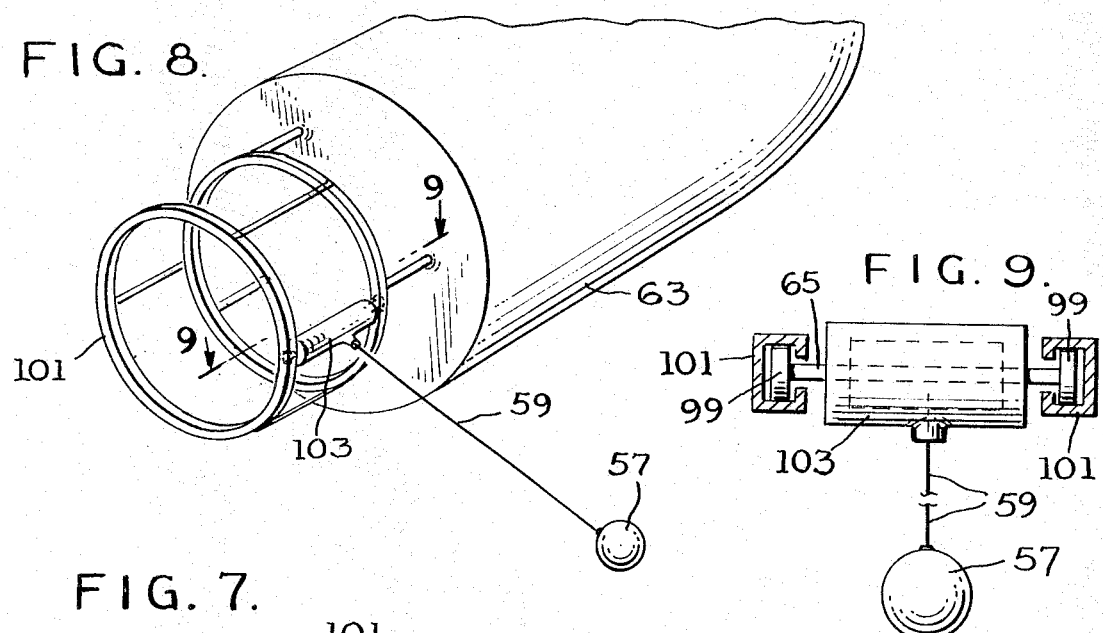
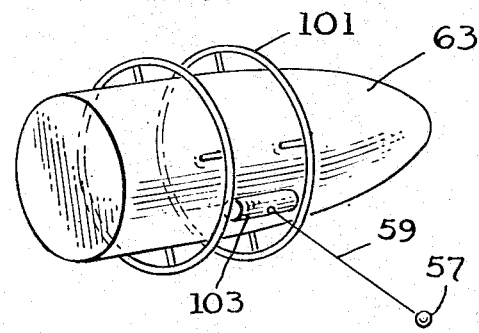
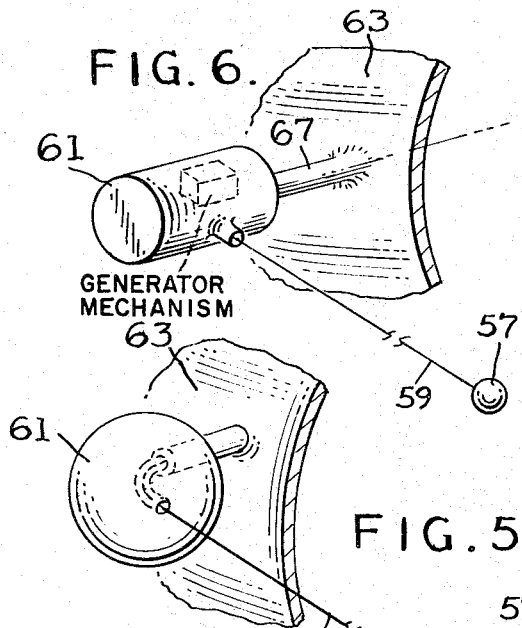
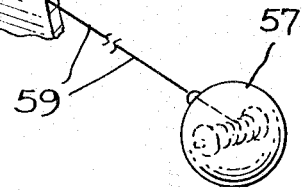
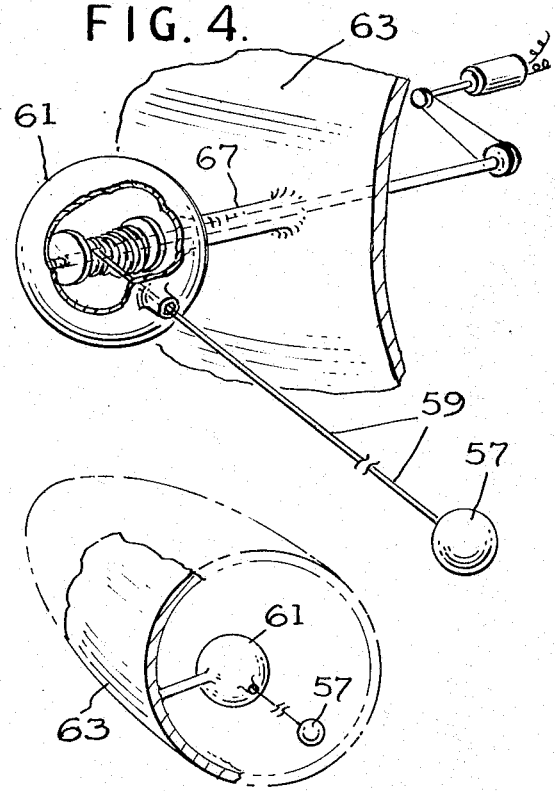

ORBITAL ENGINE

This application is a continuation-in-part of application Ser. No. 664,463, filed Aug. 30, 1967, now abandoned.

This invention relates generally to prime movers or engines and particularly to a novel space engine capable of harnessing natural orbital forces and utilizing the torque imparted to the orbiting mass of said engine by said orbital force.

Heretofore, ion and nuclear engines have been considered promising as a means for generating electrical power, etc., in space applications. Such engines are looked upon with favor in view of their relatively low fuel consumption and consequent minimization of weight and volume factors. Shortcomings, however, including problems of heat dissipation, reliability, radioactive waste disposal and shielding requirements have placed limitations upon their applicability.

The instant space engine obviates such foregoing disadvantages and uniquely utilizes a "fuel" naturally present in the space environment, said "fuel" being referred to herein as orbital force, the latter being the constant revolving motion between bodies in a space environment and being understood to be permitted by the weakened effects of gravity. Gravitational forces form and hold the constantly moving universe in relative positions, a space ship orbit being similarly the result of these forces. It should be understood that the term "space environment" as used throughout the present specification and claims refers to that environment having a weakened external gravitational force, i.e., not on the surface of or suborbital to the earth, moon, or other planetary bodies. The term does not relate to conditions of temperature, pressure, etc., but only to gravitational conditions.

In free space, the collective motion of a body or group of bodies about the mass center is completely determined by the outside torque acting upon the body or group and the nature of the constraints which are imposed upon it. A convenient measure of the "quantity of motion" is the angular momentum of the system as measured about its mass center. Regardless of energy transfer within the system itself, it is known that this quantity, the angular momentum, changes only in proportion to the integrated torque applied to the system from outside its boundaries.

Thus, where a smaller mass is tethered to a larger mass, e.g., an astronaut tethered to a space ship, orbital force applies outside torque to the astronaut, causing the latter which is the smaller mass, to orbit about the space ship, i.e., about the larger mass, the tether functioning as a substitute for gravity. It is the angular momentum of a tethered body, initiated by the natural orbital force which applies an outside torque to said body, which is herein utilized as the energy of the orbital engine to be described hereinbelow following. A study of the forces involved in the retrieval of an astronaut tethered to a space vehicle may be found in NASA Contractor Report, NASA CR-185, "Study of the Retrieval of an Astronaut from an Extra-Vehicular Assignment" by Warren H. Straly and Robert W. Adlhach, Washington, D.C., February, 1965.

Accordingly, and in consonance with the foregoing, an object of the present invention resides in the provision of a space engine comprising essentially a smaller mass tethered to and rotatable about a larger centrally-disposed mass.

Another object of the instant invention is to provide a device of the foregoing character wherein the angular velocity of the orbiting smaller mass will be controllable through adjustment of the length and tension of the tether.

A further object of this invention resides in the provision of an orbital engine which is adaptable as the prime mover in an electrical energy-generating system.

A further object of the invention resides in the provision of a method of harnessing natural orbital forces by providing an artificial system in orbit in a space environment.

A still further object of this invention is to provide a space engine which will be readily connectible to a space vehicle and expediently transportable from one vehicle to another.

Another general object of the present invention is to provide a device of the described character which will be relatively simple in structure, considerably lighter in weight than conventionally known space engines, readily controllable and highly effective in use.

Other objects and advantages of the instant orbital engine will be set forth in part hereinafter and in part will be obvious herefrom, or may be learned by practice of the invention, the same being realized and attained by means of the structure defined and pointed out in the appended claims.

The accompanying drawings referred to herein and constituting a part hereof, illustrate forms of the invention and together with the description, serve to explain the principles of the invention.

FIG. 1 is a perspective view of a preferred embodiment of the orbital engine;

FIG. 2 is an enlarged cross-sectional view taken along line 2—2 of FIG. 1; and

FIG. 3 is a side elevational, partial cross-sectional view of a modified embodiment of the orbital engine;

FIGS. 4, 5, 6, 7, 8 and 10 are schematic views representing other embodiments of the present invention;

FIG. 9 is a cross-sectional view along line 9—9 of FIG. 8.

Motion in space appears to be deceptively elementary; however, in practice, it is exceedingly complex. An astronaut, e.g., separated from his orbiting carrier vehicle, is in an individual orbit. Application of a force on a body in space results in a velocity that is retained until another force is applied. This force will cause a change in the orbital characteristics as well as an acceleration of the body. The same is true of the orbiting astronaut. In addition, an astronaut, restrained by a tether to his carrier vehicle, in general, experiences an acceleration along the restraining link. Therefore, the astronaut and carrier vehicle constitute a system in orbit that collectively reacts to the application of external forces which may be intentionally imparted thereto or which occur naturally in a space environment. Those natural external forces which act upon a system in orbit and which commonly appear under the names of gravity gradient, centripetal, and tidal forces appearing as angular momentum are collectively referred to herein as orbital force and are believed to be effective in space essentially due to the weakened force of gravity.

It is well known that in astronaut retrieval operations, energy is transferred from the space vehicle to the astronaut through the line tension exerting force in the direction of the astronaut displacement. This energy exhibits itself in the form of increased relative velocity of the astronaut which, in turn, increases line tension as the centripetal acceleration rises. Thus, the major problem encountered in astronaut retrieval operations resides in the tremendous increase in the relative velocity of the astronaut with respect to the carrier vehicle as the circular orbit of the astronaut is reduced. That is, since the angular momentum of a particle is defined as the product of its distance from the system mass center and its velocity normal to this radius vector, any large change in the relative system dimensions must be accompanied by correspondingly large changes in angular momentum and/or linear velocity of the components. The bulk of the angular momentum must display itself in the angular velocity of either the retrieving body or in an inboard momentum storage device such as a flywheel. Thus, in such astronaut retrieval operations, the angular momentum of the system in orbit must be changed to the space vehicle in order to accomplish successful retrieval of the astronaut.

An example of the force to which a space vehicle in Earth orbit is subjected in final stages of a retrieval operation appears on pages 13–15 of the above-mentioned NASA Contractor Report and is illustrated where the initial system configuration is assumed as follows: mass ratio of 20, mean separation distance of one statute mile, mean angular velocity of 10.3 radians per second, and an astronaut weight of 322 pounds. The space vehicle is the only body with sufficient dimensions to receive system angular momentum. If the space vehicle has a moment of inertia of 20,000 ft-lb-sec and the system angular momentum is all exchanged to the space vehicle, then it will have an angular velocity of about 120 rpms at the conclusion of the maneuver. To accomplish retrieval, $1.5 \times 10^6$ ft-lb of energy is required. Although the retrieved astronaut is subjected to no force, an occupant near the periphery of the space vehicle would encounter a force in excess of 40 g's.

Where an inertia wheel within the space vehicle is utilized to store the system angular momentum and an initial system configuration as illustrated above is considered, i.e., tether length, 5000 feet; angular velocity, 0.001 radians per second; and astronaut mass, 10 slugs, huge forces must be absorbed by the inertia wheel in order to permit retrieval. Thus, where the retrieval is made to within 25 feet of the system mass center and the inertia wheel has a momentum of inertia of 90 lb-ft-sec$^2$, corresponding to a mass of 10 slugs with a radius of gyration of 3 feet, the inertia wheel would have to rotate at a rate of over 25,000 rpm to absorb the system angular momentum.

The present orbital engine is, however, directed to the utilization of angular momentum imparted by orbital force to the orbiting tethered mass, rather than to the deliberate dissipation of such angular momentum as required in the aforedescribed astronaut-retrieval situations.

Referring now in detail to the present preferred embodiment of the invention illustrated in the accompanying drawings, FIG. 1 shows an orbital engine designated generally by numeral 1, said engine including three spheres or smaller masses 2, 4, and 6 arranged equilaterally or 120° apart and movably arranged about a centrally disposed and relatively larger spherical mass 8, said mass 8 functioning as the anchor mass, i.e., the theoretical center of the system in orbit, rather than the space vehicle functioning as such as in the case of astronaut retrieval operations. However, it is obvious that the space vehicle itself can become part of the larger mass 8 when it is properly connected thereto or the space vehicle itself may be substituted as the larger mass 8. The mass ratio of the smaller mass to central larger mass 8 may be suitably provided at 1:20. Other operable mass ratios may, however, be utilized. Said smaller masses are each connected to tether means or cables 10 at 12. Each of said cables is flexible and extends through arcuate passages 14 provided through said larger mass 8 and thence through elongate member or tether-guide means 16, the latter being connected to said mass 8 at 18 whereby the longitudinal axis of said elongate member is in alignment with the center of said mass 8.

As will be observed in FIG. 2 of the drawings, said elongate member 16 includes three separate passages 20, 22, and 24 disposed longitudinally therethrough in relative parallelism, each of said cables 10 extending through a respective passage and connected as shown to rotatable reels or tether-control means 26, the latter being connected to disc 28 via brackets 30, said disc being coaxially attached to said elongate member at 32.

Thus, by reason of the slidable nature of said cables through said respective passages, each cable can be payed-out from its respective reel 26 or wound thereupon to thereby regulate the distance between said respective smaller masses 2, 4 and 6 and said centrally disposed larger mass 8 and further to control the tension of said cables. That is, each of said passages 14 provided through said centrally disposed sphere 8 is terminated by two openings 34 and 36 located on the surface of said sphere, each opening 36 being in alignment with respective passage 20, 22 or 24 of said elongate member, and each opening 34 being perpendicular with respect to the longitudinal axis of said elongate member.

It will be further observed that said elongate member extends through a wall 38 of the space vehicle and is rotatably supported thereby by bearing 40 whereby rotary motion of mass 8 will be imparted to elongate member 16 thereby causing disc 28, which is located within the space vehicle, to rotate. It will be appreciated, however, that the orbital engine can be mounted entirely outside the space vehicle as is seen by FIGS. 6, 7 and 8 as well as being partially located within the vehicle as shown in FIGS. 1, 3 and 4. Furthermore, the entire engine may be miniaturized and mounted entirely within the space vehicle, as is shown in FIG. 10.

An electrical energy-generating means 42, as shown, is driven by belt 44 which extends continuously between pulley-wheel 46 and grooved periphery 48 of said generating means 42 and disc 28, respectively. It will be understood, however, that the present orbital engine may be utilized as a prime mover for purposes other than the generation of electricity.

In operation, tethers or cables 10 are payed-out to extended lengths whereby smaller orbital masses 2, 4 and 6 will occupy the broken line positions shown in FIG. 1. For purposes of illustration, crank 50 is provided to control the release and take-up of cable from and onto reels 26. Separate cranks can be provided for the independent control of each tether. In accordance with the phenomena hereinabove set forth with respect to astronaut retrieval operations, smaller masses 2, 4 and 6 and larger anchor mass 8 will constitute a system in orbit that will collectively react to the application of external forces. The system will have an angular velocity about its own mass center. The external forces herein collectively referred to as orbital forces will apply torque to said smaller masses, thereby occasioning a change of the angular momentum about the system mass center. With an increase in the angular velocity of the orbiting masses there is a corresponding increase in tension on the cables or tethers. Inasmuch as line tension varies inversely with the cube of the tether length, paying-out cables will reduce the angular velocity of the orbiting masses and conversely, a decrease in the radial distance R will cause an increase in angular velocity. It is the tension on cables 10 which acts upon extending flanges 52 which will transfer angular momentum of the orbiting masses to central spheres 8 and thus cause elongate member 16, which is integral therewith, to rotate.

In the modified embodiment shown in FIG. 3 of the drawings, the orbital engine designed generally by numeral 54 comprises a single first mass means 56 tethered by cable 58 to relatively larger second mass 60 which functions as the anchor mass, said first mass is adapted to orbit said larger mass 60 in response to torque applied by external orbital forces. Said engine is mounted upon space vehicle 62 and rotatably journalled by low friction bearing 64 in a manner similar to that shown with respect to the FIG. 1 embodiment. However, in view of the single smaller mass 56 employed in the FIG. 3 embodiment, elongate member 66 includes one axial passage 68; central larger mass 60 being provided with one arcuate passage 70 which terminates at one end with opening 72 and at the other end with opening 74, the latter being in axial alignment with passage 68 and the former being perpendicular with respect to elongate member 66. Thus, as shown, cable 58 is secured centrally of smaller mass 56 and extends therefrom through leverage flange 76 which is diametrically aligned with the mass center of mass 60, thence through said passages 70 and 68 and finally secured to tether-control means 78 which is connected by brackets 80 to disc 82.

To the end of imparting an initial torque to smaller mass 56 in order to expedite orbital motion of the system in orbit, a manually-operable crank 84 is provided whereby a gear 86 rotatable thereby, will be selectively engageable with gear 88 provided peripherally of disc 82. Thus, when crank 84 is slid through support bracket 90 to the solid line position, gear 86 will engage gear 88 and upon turning crank 84, disc 82 will turn, elongate member 66 which is coaxially connected thereto at 92 will turn as will mass 60 which is threadedly connected to said elongate member at 94. Accordingly, it will be seen that rotation of mass 60 will occasion tension in cable 58 and ultimately apply torque to smaller mass 56 to cause rotation thereof. Orbital forces will then continue the application of torque, but externally of the system, thereby imparting angular momentum to the system in orbit.

Electrical energy-generating means 96 which is supported by space vehicle 62 is arranged to absorb or harness the angular momentum of the system in orbit. Specifically, bevel gear 98 which is secured circumferentially of elongate member 66 is engaged with corresponding bevel gear 100 which is connected with driveshaft 102 of said generator 96. It will be appreciated that gears 98 and 100 may be arranged for disengagement by means of a clutch and other suitable means.

As described in connection with the preferred FIG. 1 embodiment, the length and tension of cable 58 is similarly controllable by rotatable reel 78, an electric motor 104, which is reversible, being adapted through gear 106 thereof, to rotate said reel 78 through gear 108. Thus, smaller mass 56, as shown, is maneuverable from extended positions, e.g., as shown in broken line in FIG. 3, to positions of greater proximity with respect to central mass 60 as designated, e.g., in solid line configuration.

It will be appreciated that drive means such as crank 84 can be associated with the FIG. 1 embodiment as well, such drive means being useful in the event the engine becomes overloaded or to expedite starting. Further, the cables or tethers may be tubular whereby fluid mass can be added to the smaller orbiting masses if desired, e.g., excess water from fuel cells would be pumped through the tether to hollow smaller masses thereby increasing the mass thereof. In addition, it is contemplated that the tether, in tubular form, would be usable in extravehicular activities whereby the astronaut, via manual gripping means or other suitable connecting means permitting connection to an orbiting mass 2, e.g., could be extended and retrieved with respect to a space ship as said mass orbits in the manner described hereinabove. Thus, the tubular tether would provide a passage for communicating propulsion and/or breathable gas to the astronaut, and electrical or other power thereto as may be required in the performance of the extra-vehicular activity. It will also be appreciated that the number of smaller orbiting masses can be varied, e.g.; two, four, five, etc. thereof being usable as well as one or three as shown herein.

Other embodiments of the broad concept of an orbital engine are also readily foreseeable. FIG. 4 shows a system similar to that shown in FIG. 3 except the tether control mechanism 79 is located within the anchor mass 61. In FIG. 4, the support member 67 is rotatably connected to anchor means 61. The tether control mechanism 79 may also suitably be located within the small mass 57 as is shown in FIG. 5. Furthermore, anchor mass 61 could house the generator mechanism, not shown, completely externally of the support vehicle 63 as in FIG. 6. In this embodiment the mass 61 is mounted by a stationary attachment to the support vehicle 63 via support member 67. The support member 67 passes through the housing of mass 61 and is connected to a generator mechanism therein which is responsive to the rotation of the masses 61 and 57 about the support member 67. The tether control mechanism, not shown, may be located either within the anchor mass 61 or the smaller mass 57. Furthermore, the anchor mass may be the space vehicle itself as is seen in FIGS. 7 and 8. In these figures it is seen that a guide or conductive rail 101 is provided attached to the support vehicle 63. The smaller mass 57 is flexibly connected via tether 59 to a riding means 103. Riding means 103 travels along rail 101 in response to the revolution of small mass 57 about the support vehicle 63. As can be seen more clearly in FIG. 9, the rider means 103 is rotatably connected to an axle 65. Integral with the axle 65 are discs 99 which rotate as the system travels along the rail 101. The rotating axle 65 is connected within the riding means 103 to a suitable generator of electricity, not shown. Again, the tether control mechanism may be located either within the riding means 103 or within the smaller mass 57. FIG. 10 shows the entire system of anchor mass 61 and small mass 57 located entirely within support vehicle 63.

Although specific embodiments of the orbital engine have been described, it will be understood that within the purview of this invention various other changes may be made in the forms, details, proportion and combination of the parts thereof without departing from the spirit of the invention.

What is claimed is:

1. A method of driving an engine in space, comprising:
   providing an artificial system in a space environment including a smaller mass associated by a tether to a larger mass;
   revolving said smaller mass about said larger mass;
   causing the angular momentum of the revolving smaller mass to rotate the larger mass; and
   the rotational energy of said rotating larger mass as a driving means of said system functioning as said engine.

2. An orbital system comprising at least two masses associated by tether means and rotating in a space environment and having kinetic energy and means for utilizing the kinetic energy of the rotating masses as a driving means for an engine.

3. An orbital system operable in a space environment, said system comprising first mass means associated by tether means to relatively larger second mass means, tether control means providing varying lengths of said tether means and thus permitting various rates of revolution to said system, an elongate member connected to said second mass, the longitudinal axis of said elongate member being in alignment with the center of mass of said second means, said elongate member extending from and rotatably supported by an artificial space body, said first mass means being adapted to revolve with said second mass means in response to forces which apply torque thereto, said torque being transmitted through the tether to said second mass means whereby the responsive portion of said second mass means is caused to rotate and whereby said elongate member will rotate therewith thus providing power to the elongate member which may be adapted as a driving means for various devices associated with said space body.

4. An orbital system as set forth in claim 3 including means for regulating the distance between said first and second masses and take-off means associated with said elongate member whereby the rotational energy thereof can be utilized as a prime mover.

5. An orbital engine operable in a space environment, comprising:
   an anchor mass;
   a first mass means for providing mass to orbit said anchor mass;
   tether means connectively restraining said first mass means to said anchor mass for holding said first mass means in a predetermined relationship with respect to said anchor mass;
   tether control means connected to said tether means for regulating the length and tension of said tether means whereby the distance between said anchor mass and said first mass means can be adjusted;
   said tether control means being capable of regulating the revolution of said first mass means relative to said anchor mass at variable rates of revolution dependent upon the length and tension of said tether means between said first mass means and said anchor mass; and
   transmission means associated with said anchor mass for conveying the power generated by said engine to useful work.

6. An orbital engine in accordance with claim 5, wherein:
   said first mass means comprises a plurality of smaller masses;
   said tether means comprises a plurality of tethers, each of said tethers connecting one of said smaller masses and said anchor mass; and
   said tether control means is connected to one end of each of said tethers.

7. An orbital engine in accordance with claim 5, wherein:
   said transmission means includes a generator means connected thereto for converting said power generated by the engine to electrical energy.

8. An orbital engine in accordance with claim 5, wherein:
   said anchor mass includes an artificial space body.

9. An orbital engine in accordance with claim 8, wherein:
   said artificial space body includes a guide rail attached thereto and a riding means engaging said guide rail, said riding means housing said transmission means.

10. An orbital engine in accordance with claim 8, wherein:
    said tether control means is disposed within said riding means.

11. An orbital engine in accordance with claim 8, wherein:
    said tether control means is disposed within said first mass means.

12. An orbital engine in accordance with claim 5, further including:
    an artifical space body; said anchor mass being connectively associated with said body.

13. An orbital engine in accordance with claim 12, wherein:
    said tether control means is located within said space body.

14. An orbital engine in accordance with claim 12, wherein:
    said tether control means is located within said anchor mass.

15. An orbital engine in accordance with claim 12, wherein:
    said tether control means is located within said first mass means.

16. An orbital engine in accordance with claim 12, wherein:
    said transmission means is located within said anchor mass.

17. An orbital engine in accordance with claim 12, wherein:
    said transmission means is located within said space body.

18. An orbital engine in accordance with claim 12, wherein:
    the entire engine is miniaturized and located entirely within said artificial space body.

19. An orbital engine operable in a space environment, said engine comprising first mass means tethered to relatively larger second mass means, said first mass means being adapted to revolve with said larger second mass means whereby said first and second masses constitute a system in orbit, said engine being mounted to an artificial space body, tether-guide means associated with responsive portions of said second mass and rotatable in unison therewith, said tether-guide means being rotatably supported by said space body, flexible tether means, the latter extending between said first and second mass means and secured at one end to said first mass means, the other end of said tether means extending into said second mass means and movable with respect thereto whereby the length of said tether means extending between said first and second mass means is adjustable, tether-control means connected to said tether-guide means, said control-means enabling regulation of the length and tension of said tether means whereby the distance between said first and second mass means can be adjusted, said tether control means providing varying tether lengths and thus permitting variable rates of revolution, the orbital motion of said first mass means being transmitted through said tether means to said second mass means thereby causing responsive portions of said second mass means and said tether-guide means to rotate.

20. An orbital engine as set forth in claim 19 including drive means drivingly associated with said tether-guide means, said drive means being operable to initiate rotation of said tether-guide means and said first mass means.

21. An orbital engine as set forth in claim 19 including electrical energy-generating means, said tether-guide means being drivingly associated with said electrical energy-generating means.

22. An orbital engine as set forth in claim 19 wherein said tether-control means comprises a rotatable reel from which said flexible tether means can be payed-out and upon which said tether means can be wound to thereby regulate the distance between said first and second masses and by which the tension of the tether means can be controlled.

23. An orbital engine as set forth in claim 19 including disc means coaxially connected to said tether-guide means.

24. An orbital engine in accordance with claim 19 wherein said system in orbit is disposed outside of said space body.

25. An orbital engine as set forth in claim 19 wherein said tether-guide means comprises an elongate member having a passage disposed longitudinally therethrough, said flexible tether means extending through said passage and said other end of said tether means being connected to said tether-control means.

26. An orbital engine as set forth in claim 25 wherein said second mass means comprises a sphere and is provided with a passage therethrough, said passage being terminated by two openings disposed surfacedly of said sphere, one of said openings being in alignment with respect to said passage of said elongate member, the other of said openings being perpendicular with respect to said elongate member, said flexible tether means being movable through said passage in said second mass means.

27. An orbital engine as set forth in claim 19 wherein said tether-guide means comprises an elongate member provided with a plurality of separate passages disposed longitudinally therethrough, and said flexible tether means comprises a plurality of cables, each of said cables extending through respective passages and being connected to a said first mass means.

28. An orbital engine as set forth in claim 27 wherein said second mass means comprises a sphere provided with three passages therethrough, each of said passages being terminated by two openings disposed surfacedly of said sphere, one opening of each passage being aligned with a respective separate passage of said elongate member, the other opening of each passage being perpendicular with respect to said elongate member, said other openings being respectively 120° apart, said first mass means being comprised of three separate spheres, each separate sphere being connected to one end of a respective cable.

29. An orbital engine as set forth in claim 28 wherein said tether-control means comprises three rotatable reels from which selective lengths of respective cables can be payed-out and upon which said respective cables can be wound to thereby regulate the distances between said separate orbiting spheres and said centrally disposed sphere and by which the tension of said respective cables can be regulated.

30. An orbital engine as set forth in claim 28 wherein an elongate flange extends outwardly and peripherally of each said other opening of each passage, each respective cable being slidable through each said elongate flange.

* * * * *

UNITED STATES PATENT OFFICE
CERTIFICATE OF CORRECTION

Patent No. 3,868,072    Dated February 25, 1975

Inventor(s) Charles P. FOGARTY

It is certified that error appears in the above-identified patent and that said Letters Patent are hereby corrected as shown below:

Column 7, line 20, claim 1 - before "the rotational" insert
--using--

Signed and sealed this 22nd day of April 1975.

(SEAL)
Attest:

RUTH C. MASON
Attesting Officer

C. MARSHALL DANN
Commissioner of Patents
and Trademarks